(12) United States Patent
Huang et al.

(10) Patent No.: US 7,356,236 B1
(45) Date of Patent: Apr. 8, 2008

(54) FIELD-USE APPARATUS FOR INSPECTING AND CLEANING FIBER OPTIC CONNECTORS

(75) Inventors: Shangyuan Huang, Kent, WA (US); Ge Zhou, Kent, WA (US); Pai-Sheng Shen, Bellevue, WA (US)

(73) Assignee: Lightel Technologies Inc., Kent, WA (US)

( * ) Notice: Subject to any disclaimer, the term of this patent is extended or adjusted under 35 U.S.C. 154(b) by 0 days.

(21) Appl. No.: 11/611,095

(22) Filed: Dec. 14, 2006

(51) Int. Cl.
*G02B 6/00* (2006.01)
(52) U.S. Cl. ..................... 385/134; 385/135
(58) Field of Classification Search ............... 385/134, 385/135
See application file for complete search history.

(56) References Cited

U.S. PATENT DOCUMENTS 5,332,499 A * 7/1994 Spencer ..................... 210/396
5,396,366 A   3/1995 Brown et al.
5,982,533 A   11/1999 Dominique
6,681,437 B1  1/2004 Miyake
6,760,534 B1  7/2004 Son
6,793,399 B1  9/2004 Nguyen

* cited by examiner

*Primary Examiner*—Jennifer Doan
(74) *Attorney, Agent, or Firm*—Pai Patent & Trademark Law Firm; Chao-Chang David Pai

(57) ABSTRACT

A portable apparatus for inspecting and cleaning fiber optic connectors which comprises a housing, an adapting tip receptacle on a top side of the housing, an optical module embedded in the housing, a focusing knob connected to the optical module, an LCD screen on a front side of the housing for displaying the image of the endface of the connector interfaced with the apparatus, and a cleaner module. In conjunction with a set of universal tips for male connectors, a set of converters are provided to form universal tips for female connectors, which greatly simplifies the overall tip family.

19 Claims, 9 Drawing Sheets

FIELD-USE APPARATUS FOR INSPECTING AND CLEANING FIBER OPTIC CONNECTORS

BACKGROUND OF THE INVENTION

1. Field of the Invention

The present invention relates to a field-use hand-held apparatus for inspecting and cleaning optical fiber connector endfaces. More particularly, the invention relates to such an apparatus capable of interfacing with both male and female connectors with a relatively smaller set of adapting tips than prior art apparatus.

2. Description of the Related Art

In a typical optical fiber connector, an optical fiber has a terminal portion, which is surrounded by a ceramic ferrule. To couple the light from the fiber in one connector to the fiber in another connector, a mating adaptor is needed. This pair of connector ferrules can be accurately aligned (face to face) via a mating sleeve inside the connector mating adapter. We refer to an in-adaptor connector (i.e. the assembly with a connector that is plugged into an adaptor) as a 'female' connector; and refer to a free connector (not in an adaptor) as a 'male' connector. Up to date, a large variety of connector types have been developed and used in different applications.

The quality of fiber connector endfaces directly affects the optical fiber network performance. Dirt, grit and airborne contaminants can significantly increase the link insertion loss and decrease the return loss, thus causing network performance degradation and BER (Bit Error Rate) failure. According to the experience of fiber installation workers, dirty connector end-faces are a common problem found during troubleshooting of fiber links.

In principle, a new fiber patch cord from the cord manufacturer should come with clean connectors. But this may not always be guaranteed; and moreover the connector may be re-contaminated due to an improper action. For example, an endface being accidentally touched can cause significant dirt to be lodged on the connector endface. Such a dirty connector can further contaminate its mating connector, spreading the contamination. Therefore it is necessary for installers to always inspect each connector endface before inserting it into a mating adapter. If the connector is found dirty, cleaning the connector surface also becomes necessary.

There are several types of connector inspectors commercially available in today's market. For field use, portable inspectors mainly include Optical Microscopes (direct optical viewer) and Hand-Held Video Microscopes (consisting of an inspection probe and an LCD display, as shown in FIG. 1). Generally speaking, the Optical Microscope is for viewing Male connectors only (e.g. patch cords) because the object connector must be brought to the microscope site, i.e. close to your eye. Another drawback of Optical Microscope is the eye-safe issue when an operator directly peers at a fiber output surface and the fiber carries high optical power. To prevent any eye injury, some microscopes include a laser safety filter inside the optical path. Another solution is to build a miniature camera and micro display inside the microscope so as to avoid any direct contact between the light and operator's eye. But this solution does not help release the application limitation, i.e. you still have to bring the object connector close to your eyesight for inspection.

In comparison, Hand-Held Video Microscopes (see FIG. 1) are definitely eye-safe and much more flexible. A Hand-Held Video Microscope includes two primary parts: an inspection probe 70 and an LCD display 18'. They are connected by a long electrical cable 71. As the first primary part, the inspection probe can easily access locales a little distant from you or awkward to access. With this advantage, instead of bringing a connector to the scope, Hand-Held Video Microscopes can work for connectors that are affixed in a position and not movable. Most 'female' connectors belong to this category. With specially designed adapting tips for the Hand-Held Video Microscope probe, not only male connectors but also female connectors can be easily accessed and inspected. As different adapting tips should be mounted onto the probe for interfacing with different connectors, the Hand-Held Video Microscope manufacturers often offer a large family of adapting tips, with different ferrule sizes, different polishes (AC or APC), and different status (male or female). As the second primary part, the LCD display is not only ideal for eye safety but also much more flexible because it does not need to follow the probe to the connector accessing position. Besides, looking at a screen is much more comfortable than directly peering through a scope window. As an alternative configuration, a computer can replace the LCD unit, and the image shown on the computer can be processed and saved by using special software. In such a configuration, a video image capture device is generally needed between the probe and the computer.

Connector cleaners are also commercially available in different categories. Field-use cleaners for 'male' connectors include wipes (with or without a solvent), reel cleaners (cleaning tape cassettes), card cleaners (a sheet with multiple window slots), etc. As for field-use cleaners for 'female' connectors, the most popular tools are still swabs or sticks. Some semi-automated portable cleaning devices have also been released in recent years, e.g. the pen-type cleaner and the drill-type cleaner.

Although the importance of pre-inspection and cleaning has been widely recognized by installers, no product is yet available in today's market that can allow installers operating a single portable apparatus with multiple functions. U.S. Pat. No. 6,760,534 by Son disclosed a hand-held scope and cleaning tool. But it is not an eye-safe unit, and it can work for male connectors only.

Accordingly, it is the primary object of the present invention to provide a compact apparatus that allows multiple functions. A further object of the present invention is to provide an apparatus that is safe and flexible for users. Yet another object of the present invention is to provide an apparatus that is relatively simple and inexpensive.

SUMMARY OF THE INVENTION

A portable apparatus for inspecting and cleaning fiber optic connectors according to the present invention comprises a housing, an adapting-tip receptacle on a top side of the housing, an optical module embedded in the housing, a focusing knob connected to the optical module, an LCD screen on a front side of the housing for displaying the image of the endface of the connector interfaced with the apparatus, and a cleaner module. The adapting-tip receptacle is a port on the housing for accepting different universal adapting tips, each of which has one end pluggable in the adapting-tip receptacle and the other end sized to receive male connectors of each standard ferrule size and polish type (PC or APC). When such universal adapting tips for male connectors are provided with a set of converters, universal adapting tips for female connectors are created. Each of the converters comprises a GRIN relay lens enclosed in a tube casing. The converter is to be inserted into the ferrule-mating sleeve of the connector adapter for female connectors, therefore only one converter is needed for all female connectors of each standard ferrule size and polish type (PC or APC), without regard to the connector housing type. The converters, thus the universal adapting tips, for female connectors substantially simplifies the overall tip family needed for all field inspection by reducing the total number of adapting tips in the family. To extend its flexibility for a wider range of female connector inspection applications, this apparatus allows an external inspection probe access. Once an external inspection probe is plugged, the LCD on the apparatus will display the endface image obtained from the inspector probe. The above concept of tip-family simplification is similarly applicable to inspector probes. The cleaner module is provided to allow the connector endfaces found dirty by the inspection to be cleaned conveniently on the spot. The cleaner module can be mounted to and dismounted from the apparatus through a snap-in mechanism. Cleaning wiper stack is provided in a cassette which allows wiper sheets to be advanced and torn off after use.

The portable apparatus for inspecting and cleaning fiber optic connectors according to the present invention also has a power saving feature, illumination LEDs for illuminating connector endfaces; a USB video output port for outputting connector endface images to external electronic devices for display or storage.

DETAILED DESCRIPTION OF THE INVENTION

Figure 1:
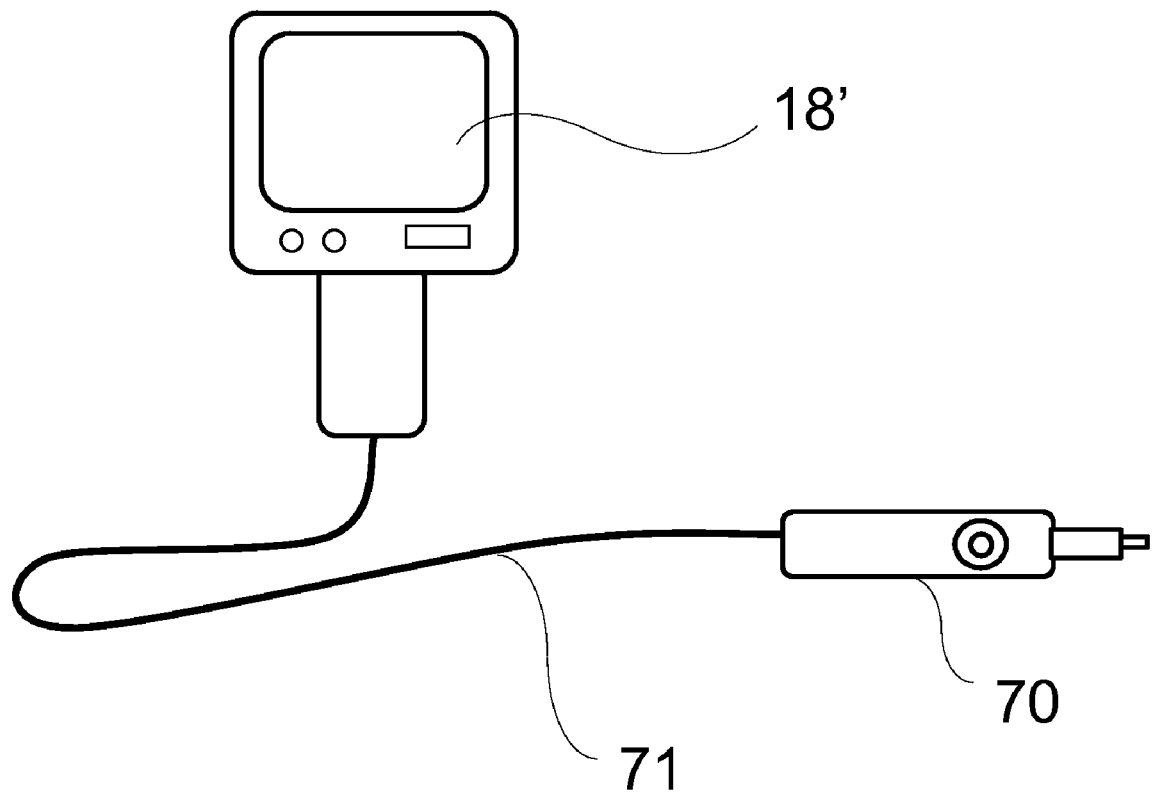
FIG. 1 illustrates a conventional hand-held video microscope including an inspection probe and an LCD display connected with a long electrical cable.
Figure 2:
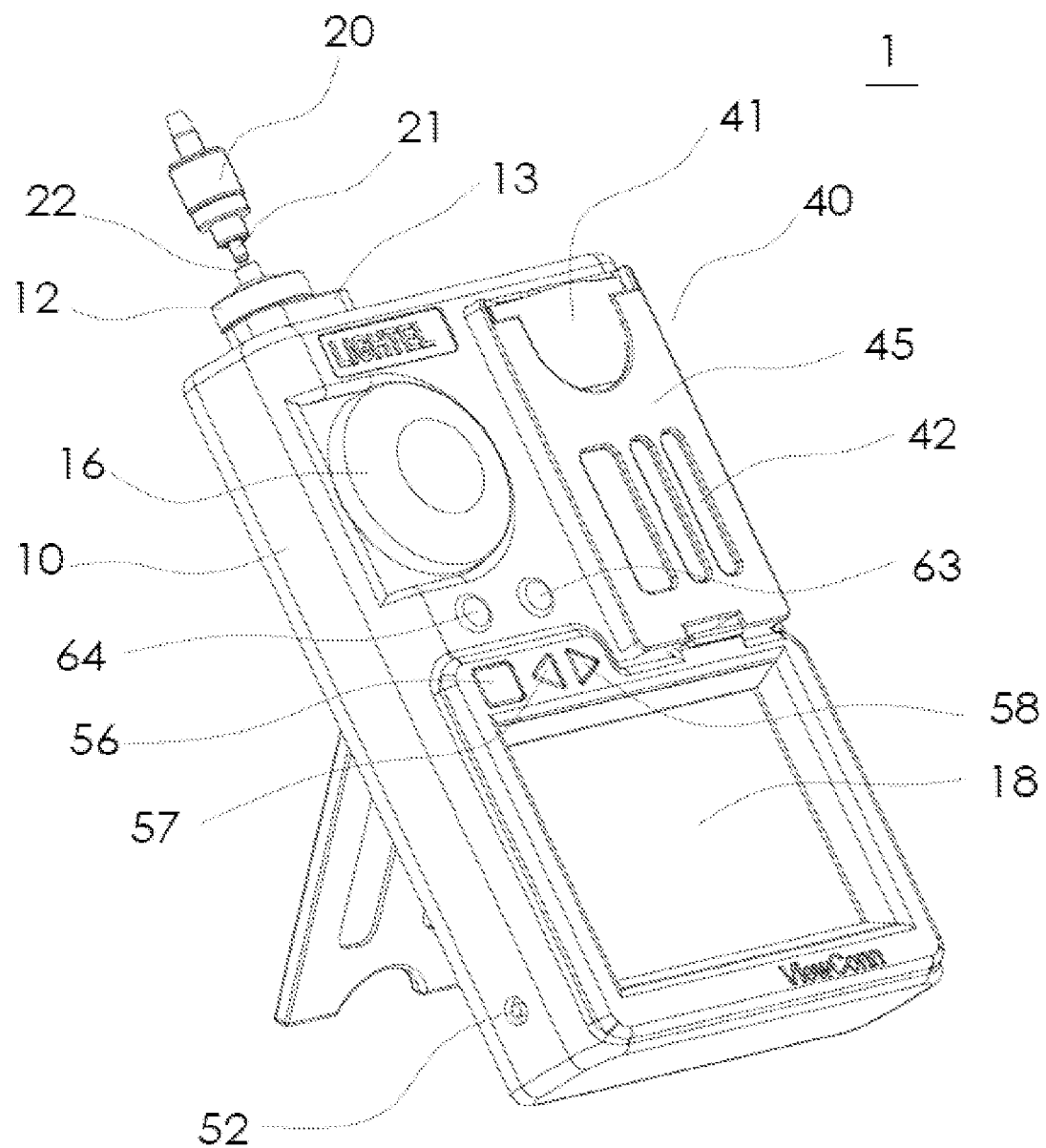
FIG. 2 is a perspective view of the apparatus for inspecting and cleaning fiber optic connectors according to the present invention, as seen from the left-hand side.
Figure 3:
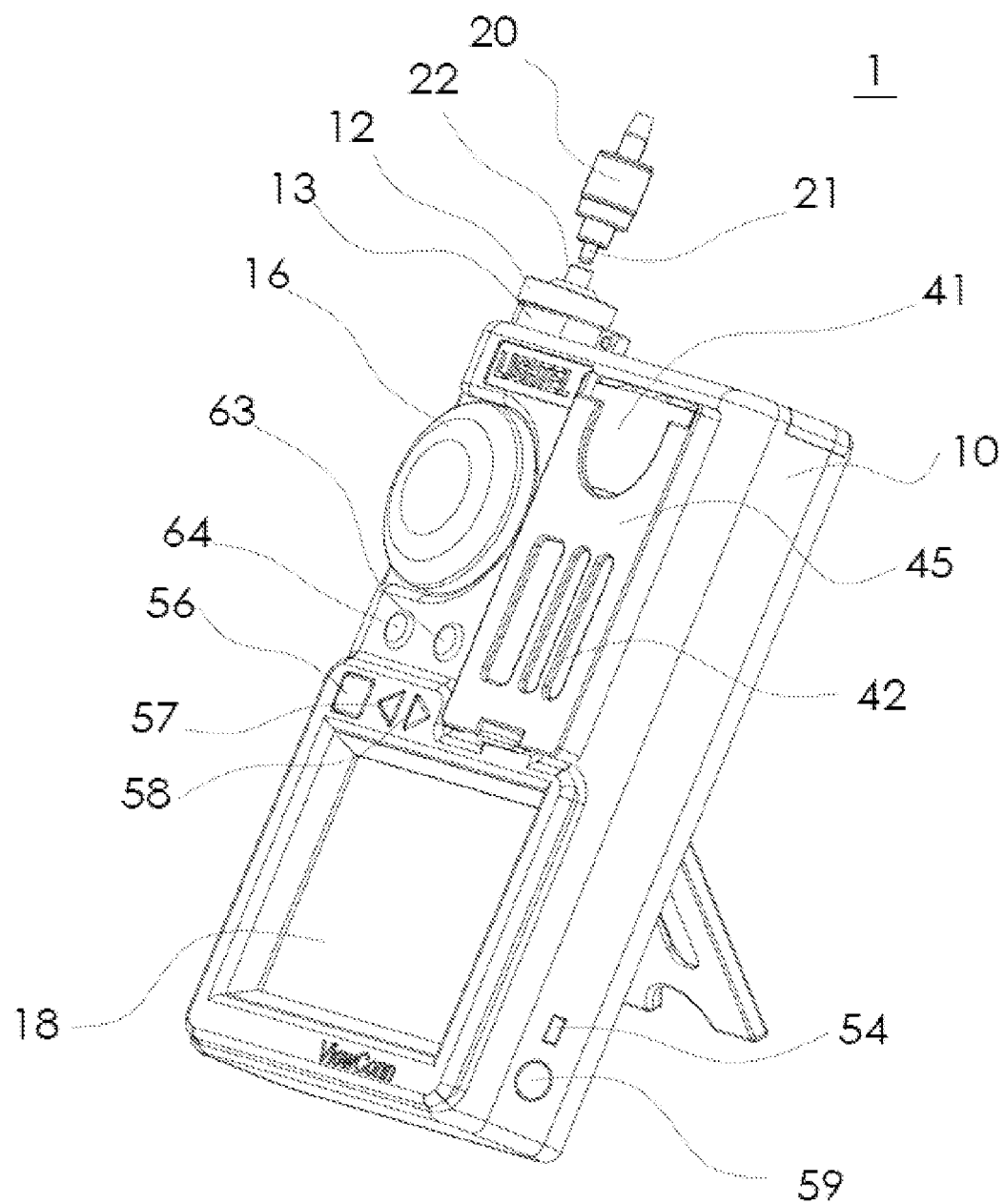
FIG. 3 is a perspective view of the apparatus for inspecting and cleaning fiber optic connectors according to the present invention, as seen from the right-hand side.
Figure 4:
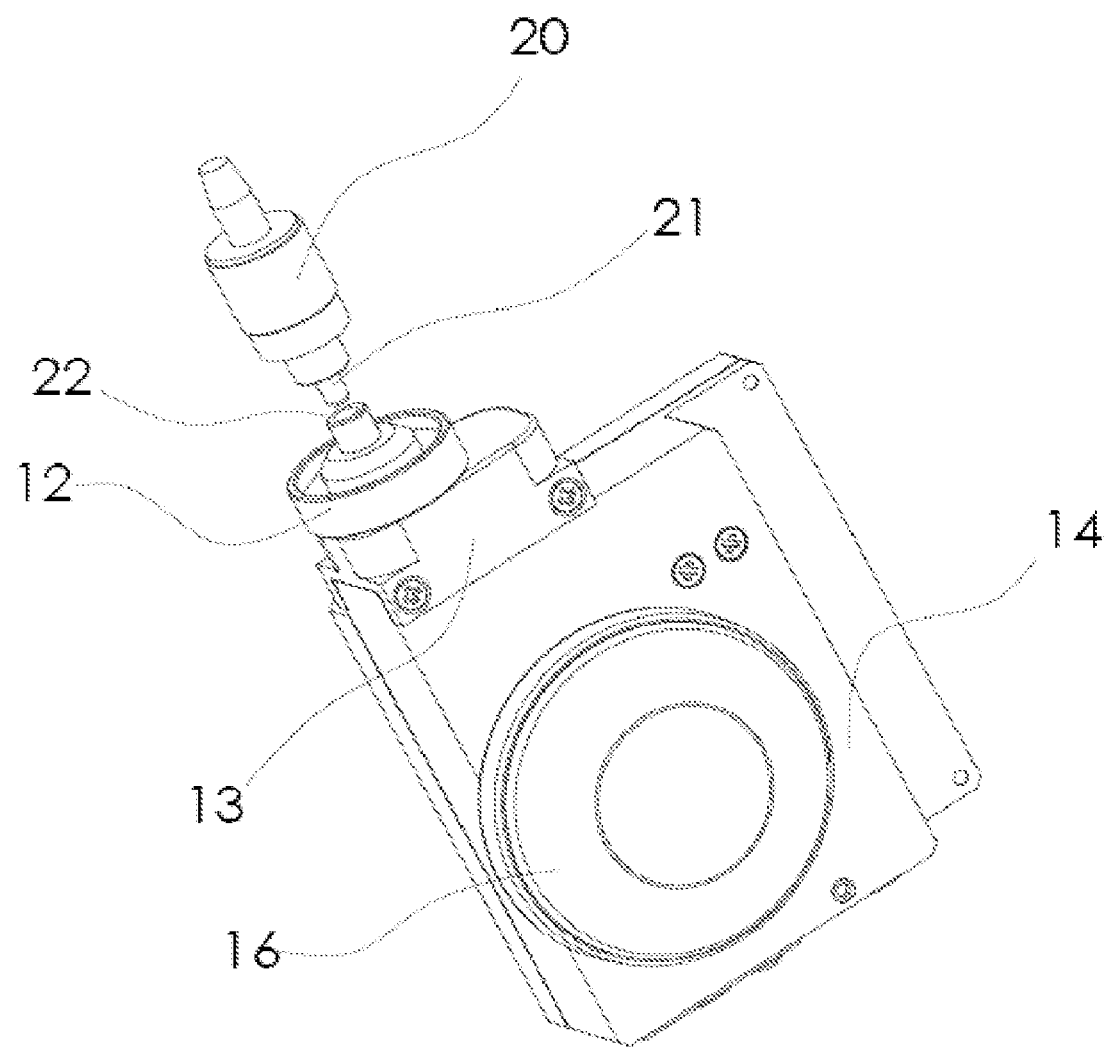
FIG. 4 illustrates the focusing knob of the apparatus connected to the optical module according to the present invention.

As illustrated in FIGS. 2-4, the portable apparatus 1 for inspecting and cleaning fiber optic connectors according to the present invention comprises a housing 10, an adapting-tip receptacle 13 on a top side of the housing, an optical module 14 embedded in the housing 10, a focusing knob 16 connected to the optical module 14, an LCD screen 18 on a front side of the housing 10, and a cleaner module 40.

Adapting-Tip Receptacle

The adapting-tip receptacle 13 is a port on the housing for accepting different pluggable adapting tips 12. An adapting tip 12 has one end to be plugged and locked into the adapting-tip receptacle 13; the other end of the adapting tip 12 has an adapting port for adapting the ferrule 21 of a male fiber-optic connector 20 to be inspected. Different connectors 20 with different ferrule sizes or different polishes (PC or APC) require different adapting tips 12. However, connectors 20 with the same ferrule size require just one adapting tip 12 for each different polish (i.e., one for PC polish and one for APC polish), as will be explained below.

Optical Module and Focusing Knob

The optical module 14 is virtually a camera assembly, including an imaging optics system and an image sensor (CCD or CMOS). As illustrated in FIG. 4, when the ferrule 21 of a male connector 20 is inserted into the adapting tip 12, the optical module 14 captures the endface image of the ferrule 21 of the male connector 20 and converts the image into a video signal, which will be displayed on the LCD screen 18.

The imaging optics system is designed to provide a certain optical magnification. The focusing knob 16 is mechanically connected to the imaging optics system. By adjusting the focusing knob 16, the image of the connector endface can be focused onto the sensing surface of the image sensor.

Power Supply and Power Saving

The apparatus 1 is powered by batteries or by a DC adapter connected to a city power line. The batteries are preferably installed in a battery compartment in the backside of the housing 10. A low-battery warning light can additionally be provided. The DC adapter port 52 illustrated in FIG. 2 is provided for a DC adapter to plug in when a city power supply is used.

Conventional field-use connector microscopes often adopt a simple power-saving approach by setting a fixed time period. Once the set time period has lapsed, regardless of whether or not the microscope is still in use, the power for the microscope will be turned off, whether or not the microscope is still in use, and the user must push a button to resume the operation. Similarly, for power saving, the power for the apparatus 1 can be automatically shut down after the apparatus 1 is powered on after a certain time period, say 5 minutes. Its power may be resumed by pressing on/off button 56.

Alternatively, the power saving capability in the present invention can be designed based on the viewing activity. A sensor can be provided to sense the viewing activities. This sensor may work in a steady mode or in a triggered mode. In the steady mode, the power is held on only if a connector is plugged into the tip. For this mode of power saving, a light-detecting sensor is disposed by the side of the main optical path (but still within the optical aperture) and facing the connector. If the sensor detects a certain amount of reflective light, which means a connector is plugged in, then the auto-shutdown function is not activated. But once the sensor detects no reflective light, i.e. no plugged connector, then the auto-shutdown function will be activated and the power will be automatically turned off after 5 minutes or another preset time period. However, with this mode, if a connector 20 is left unattended in the adapting tip 12, the auto-shutdown function would not be triggered. In the triggered mode, the power lasts for a fixed period of time (say 5 minutes) regardless of whether a connector 20 is plugged in the adapting tip 12, unless this apparatus 1 is triggered and thus the clock is reset. For this mode of power saving, a motion sensor is disposed near the adapting tip 12 so as to sense the plugging and unplugging of the connector 20. If no motion is detected in its close proximity, the power will be automatically shut down after the preset period of time. If the connector is still being inspected, the user can press the power button 56 to reset the auto-shutdown clock.

LCD Display Screen

The image of connector ferrule endface is displayed on the LCD screen 18. The brightness of the LCD screen can be adjusted higher or lower by two brightness adjusting buttons 57/58, which are shown in FIG. 2. External buttons for contrast adjustment can also be arranged in a way similar to the brightness adjustment buttons 57/58. As an example illustrated in FIG. 2, a contrast toggle button 63 is to allow switching between a normal contrast mode and an enhanced contrast mode (for highlighting the details in the dark area, e.g. the fiber glass area.)

Illumination LEDs

A coaxial illumination is provided by a main axial illumination LED (not shown) inside the optical module 14. The light from this LED travels along the main optical path inside the optical module and shines on the connector endface to provide axial illumination. A side illumination LED can also be disposed inside the optical module 14, close to the adapting-tip receptacle 13. This side illumination improves the showing of the fiber core condition. The side illumination toggle button 64 is provided for the user to switch the side illumination LED on and off.

USB Video Output Port

The apparatus 1 further has a USB video output port 54 to allow the video signals corresponding to the endface image of the connector ferrule 21 to be captured and output through a USB cable to a computer or other electronic devices for display or storage.

Inspector Probe Access Port

From the fact that the LCD screen 18 and the adapting-tip receptacle 13 are disposed on the same body, this apparatus is more likely to be used for inspecting 'male' connectors. In order to allow more flexibility in inspecting 'female' connectors, the apparatus 1 includes an inspector probe access port 59 for an external inspector probe 70. Once an inspector probe 70 is connected to the inspector probe access port 59, the LCD screen 18 will display the image captured by the inspector probe 70, instead of the image captured by the optical module 14 inside the apparatus 1.

It should be noted that, although the apparatus 1 cannot cover as broad a range of female connector cases as the conventional hand-held video microscope, it still allows inspection of any movable female connectors that can be brought to the apparatus 1, or any affixed female connectors that allow a sufficient space for the apparatus 1 to access and a reasonable distance/angle for the user to view the LCD screen 18 on the apparatus 1.

Universal Tips for Male Connectors (UTFMC)

Figure 5:
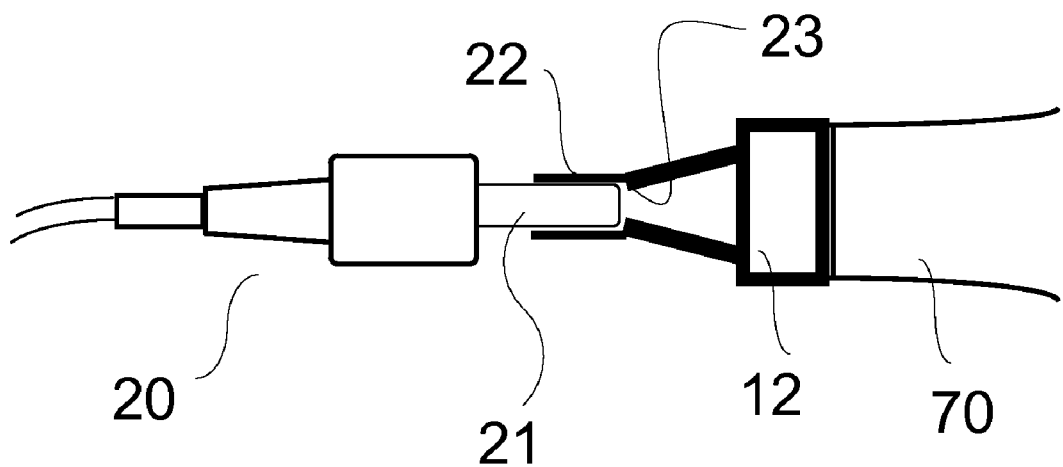
FIG. 5 illustrates the use of a universal tip for interfacing with male connectors as in prior art.

A conventional hand-held video microscope usually offers a number of optional adapting tips to be mounted onto its probe in order to interface with different types of connectors. For male connectors, a universal adapting tip (UTFMC) will work for all the male connectors having the same polish (PC or APC) and a same standard ferrule size (e.g. 2.5 mm, 1.25 mm, and so on). For example, a universal 2.5 mm PC adapting tip can work with all 2.5 mm PC-polish connectors such as SC/PC, FC/PC, ST/PC, E2000/PC, etc. As illustrated in FIG. 5, the connector ferrule 21 of a male connector 20 is inserted into the channel 22 at the front end of a universal adapting tip 12. The channel 22 has an inner diameter slightly larger than, but substantially equal to, 2.5 mm. A shallow step 23 all around on the inner wall of the channel 22 stops the ferrule edge at a proper depth. Therefore, no matter what the type of PC-polish connectors is, as long as the connectors 20 have a 2.5 mm ferrule, they can work with this universal adapting tip 12. Similarly for APC-polish 2.5 mm connectors (such as SC/APC, FC/APC, E2000/APC, etc.), a different universal adapting tip (i.e. universal 2.5 mm APC adapting tip) is needed. Moreover, for connectors of each polish type (PC-polish or APC-polish) with another ferrule size (e.g. 1.25 mm, 1.6 mm, 2.0 mm, etc.), a different universal adapting tip will be needed.

With the same idea, the adapting tips 12 for male connectors in apparatus 1 can be merged into a smaller set of UTFMCs. Although the adapting tip 12 is shown in FIG. 5 to be connected to an inspector probe 70, an adapting tip 12 with one end compatible with the adapting-tip receptacle 13 of the apparatus 1 will work the same way with male connectors as described above. As illustrated in FIG. 4, the channel 22 is disposed in the middle of the adapting tip 12.

Universal Tips for Female Connectors (UTFFC)

However, adapting tips for inspecting female connectors (i.e. in-adapter connectors) are more complicated. A conventional hand-held video microscope generally provides an individual tip for each type of female connectors. For example, adapting tips for inspecting female SC/PC, FC/PC, ST/PC, E2000/PC connectors are all different—though they have the same ferrule size and polish. This is because the adapting tip for a female connector needs to fit into the adapter housing of the connector-mating adapter in order to achieve a correct and stable alignment. In other words, the inspection alignment takes the inner structure of the connector-mating adapter (namely the adapter housing) as the reference. Different inner structures will call for different adapting tips for inspection alignment. Due to the large variety of adapter housing, the hand-held video microscope manufacturers usually have to offer a large family of adapting tips. As a result, users are often confused by the overwhelmingly many choices and have to buy many different adapting tips.

Figure 6:
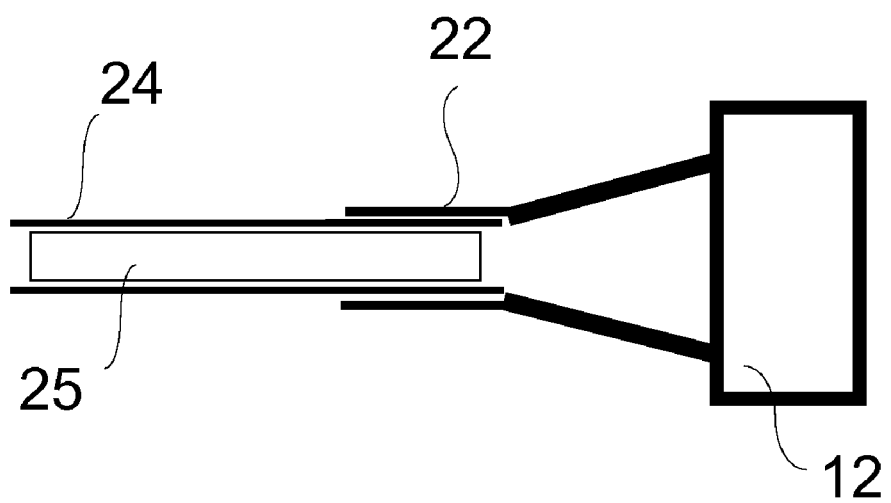
FIG. 6 illustrates the structure of a universal tip for female connectors according to the present invention.
Figure 7:
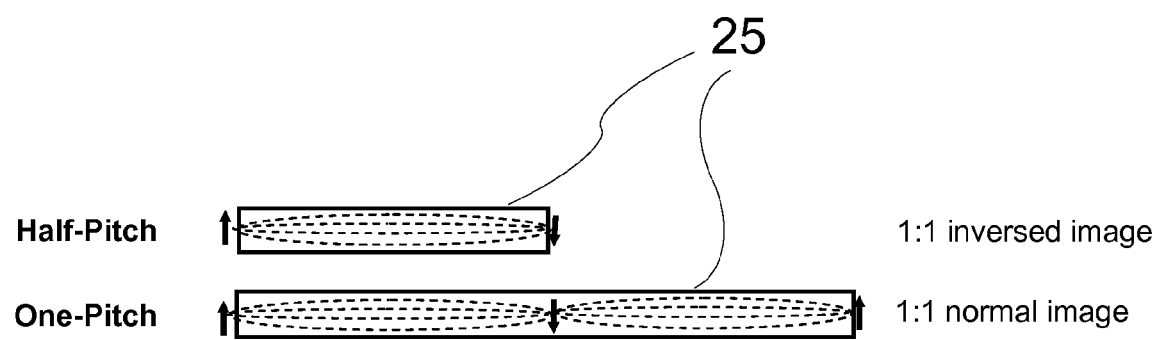
FIG. 7 illustrates how the gradient refractive index (GRIN) relay lens optically relays images of connector endface as a function of its length.

In principle, to view female connectors, the apparatus of present invention can also be equipped with various female-connector adapting tips. But, for field applications, a much simplified tip family is required. To greatly condense the tip repertoire, universal tips for female connectors (UTFFC) are disclosed in the present invention. In reference to FIG. 6, the UTFFC disclosed in this invention is a combination of a universal tip for male connectors ("UTFMC") 12 plus a converter. The converter is an assembly of a tube casing 24 and a gradient refractive index (GRIN) relay lens 25 enclosed by the tube casing 24. A portion of the converter is snugly housed inside the channel 22 of a UTFMC 12. This tube casing 24 has an outer diameter slightly smaller than, but substantially equal to, a standard connector ferrule diameter (e. g. 2.5 mm, 1.25 mm, 1.6 mm, 2.0 mm, etc.) The optical relay of the image through the GRIN relay lens 25 is illustrated in FIG. 7.

Figure 8:
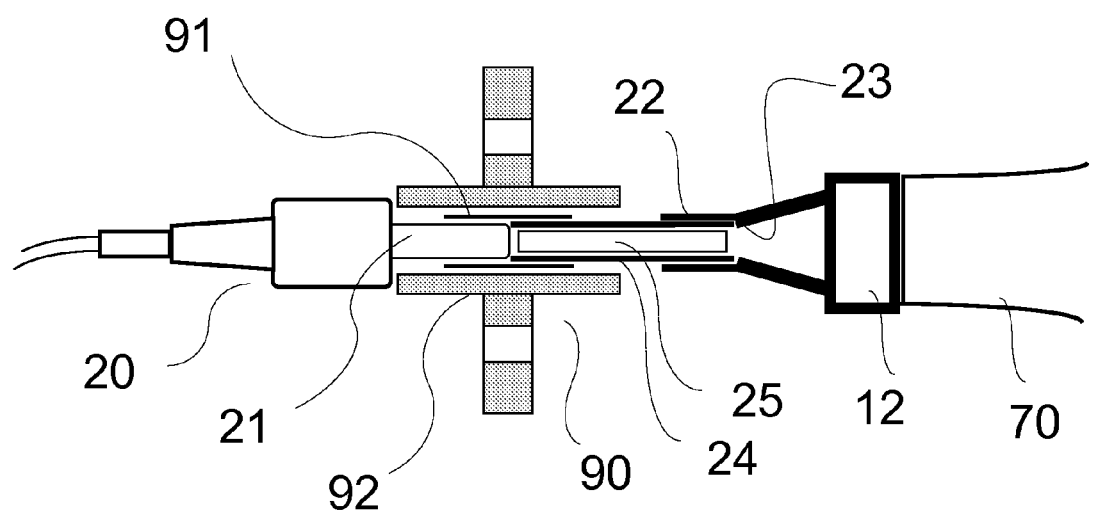
FIG. 8 illustrates the use of a universal tip for interfacing with female connectors according to the present invention.

FIG. 8 sketches how a UTFFC works for female connector inspections. During inspection, the front portion of the converter is inserted into the ferrule-mating sleeve 91 inside the connector-mating adapter 90. A similar insertion method was disclosed in U.S. Pat. No. 6,793,399 to Nguyen ('399 patent). But in the '399 patent, individual BOPAs (borescope-to-optical port adapter) that are compatible with each individual connector-adapter types are required. In the present invention, instead of referencing to the mechanical structure of each different type of connector-mating adapters, the reference becomes the ferrule-mating sleeve 91 which is common for each family of connectors with a same ferrule size. In a sense, the tube casing 24 with a GRIN relay lens 25 acts as an add-on converter to convert UTFMCs to UTFFCs. Thus the large variety of the female-inspection tips can be eliminated and only a few such add-on converters are required to work with the existing UTFMCs. Typical converters include a converter for the 2.5 mm PC-polish female-connector family (FC/PC, SC/PC, ST/PC, E2000/PC, etc.), a converter for the 2.5 mm APC-polish female-connector family (FC/APC, SC/APC, E2000/APC, etc.), a converter for the 1.25 mm PC-polish female-connector family (LC/PC, MU/PC, E3000/PC, etc.), etc.

As mentioned above, the GRIN relay lens 25 is housed in a tube casing 24 that has an outer diameter close to the connector ferrule diameter. So, given a certain thickness of the wall of the tube casing (say 0.3 mm), a range of the diameter of the GRIN relay lens 25 can be chosen, say 0.5 mm 1.8 mm, based on the connector ferrule size in the connector family. As for the length of the GRIN relay lens 25, as long as it is an integral multiple of the half-pitch length, a 1:1 optical relay is achieved. If the length of the GRIN relay lens 25 is an odd number multiple of the half-pitch length, the image obtained will be inverted; while if it is an even number multiple of the half pitch length, the image obtained will be a normal image. Generally speaking, for fiber optic connector inspection, the image orientation is not critical, thus more flexibility is allowed in selecting the length of GRIN relay lens 25. In principle, the length of the GRIN relay lens 25 chosen should be long enough to cover the deepest access of all kinds of connector-mating adapters in this family. But on the other hand, there is no need to over design the length considering the cost of the GRIN rod and the tube ruggedness versus length. GRIN rod manufacturers usually offer many options in the rod diameter and the pitch length. In actual applications, GRIN relay lenses are often selected to be slightly shorter than its nominal pitch length. For example, a 0.46~0.48 pitch GRIN relay lens may actually be adopted for a 0.5-pitch lens. This is to allow both the object and the image to be slightly outside where the GRIN rod ends so as to prevent the object or the image sensor from touching the end of the GRIN rod. This is especially important for the present application because we don't want the inspector tip to touch the area to be inspected. From FIG. 5 and FIG. 8, it can be seen clearly that the GRIN relay lens 25 is slightly recessed from the end of the tube casing 24. A recess of 1 mm~2 mm is a preferred choice.

Figure 9:
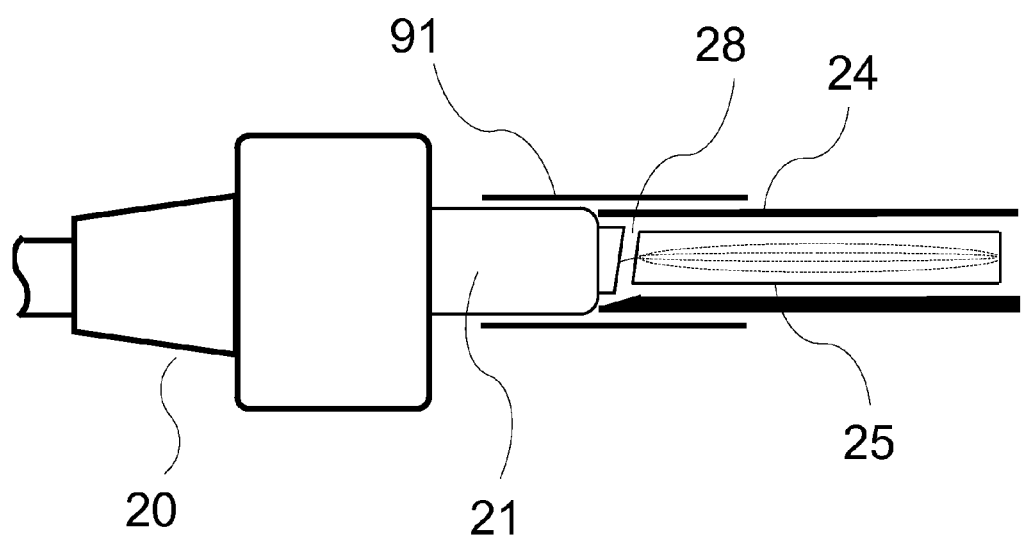
FIG. 9 illustrates a universal tip modified for interfacing APC-polish female connectors according to the present invention.

The insertion depth control of a UTFFC is similar to the UTFMC case. While inspecting a female connector, the converter is inserted into the ferrule-mating sleeve 91 in the connector-mating adapter 90 until the edge of the tube casing 24 touches the connector ferrule chamfer edge, as illustrated in FIGS. 8-9. Therefore, the stopping reference becomes the ferrule surface itself and is independent of any other part of the connector-mating adapter 90, thus making a universal converter possible. Moreover, in a connector-mating adapter 90, the ferrule-mating sleeve 91 is a key element for the transverse alignment, while the structure of the adapter housing 92 (usually plastic) of the connector-mating adapter 90 is less critical, i.e. with greater dimension tolerance. Unfortunately, today's conventional inspector tips for female connectors are inserted in reference to the adapter housing 92 for transverse alignment, so the fiber images are often found offset from the center of the display screen. In the present invention, because the universal tips for female connectors are designed in reference to the ferrule-mating sleeve 91 (the most critical element in controlling fiber-to-fiber mating with a micron-tolerance for offset), a much better image-centering can be achieved.

In contrast to PC-polished connectors, typical APC-polished connectors have an angled endface by 8 degrees, which greatly improves the connector return loss than in the case of PC-polish connectors. But the 8-degree tilting of the endface causes a beam deflection while the axial illumination light is reflected back. To compensate for this light beam deflection, this end of the GRIN relay lens 25 is angled by an 8-deg polish as shown in FIG. 9; or instead, an 8-degree mini-prism can be added in front of a normal GRIN relay lens 25. With this angle, the light beam is deflected back to the axial direction. Since the illumination light in a connector video microscope is usually monochromatic (typically blue), any chromatic dispersion concern related to light beam deflection can be ignored.

As mentioned above, a small air gap 28 is needed between the connector ferrule 21 and the endface of the GIIN relay lens 25. But under APC connector inspections, such a small air gap accumulates a small offset of the light beam. To make the light beam hit the center of the converter upon entering the converter, an asymmetric wall thickness is provided in the tube casing 24. As illustrated in FIG. 9, the wall of the tube casing 24 is slightly thicker at the bottom side than at the upper side. In fact, other measures can also be taken to adjust the light beam so that it hits the center of the converter. For example, small bumps can be provided on the inner wall of the tube casing 24 corresponding to the ends of the GRIN relay lens 25 to make the GRIN relay lens 25 slightly off-centered to achieve the same correction.

It can also be seen from FIG. 9 that the end of the GRIN relay lens 25 is recessed somewhat deeper from the end of the tube casing 24 for an APC converter than it is for an a PC converter due to the angled endface of the APC-polish connector. With all the needs for a correct orientation (correct angle orientation of GRIN lens endface, correct asymmetric-wall orientation) considered, an APC converter should have an orientation mark or an orientation controlling-mechanism to control its inserting orientation.

From the foregoing discussion we see that, from the large tip family of current commercial inspectors, the tips for female connectors, whether they are PC-polish or APC-polish, can be totally eliminated. In conclusion, with the present invention, we only need a few universal tips for male PC-type connectors (e.g. a 2.5 mm PC-type UTFMC, a 1.25 mm PC-type UTFMC, . . . ), plus a few corresponding converters (e.g. a 2.5 mm PC-type converter, a 2.5 mm APC-type converter, a 1.25 mm PC-type converter, a 1.25 mm APC-type converter . . . ) to cover the huge tip variety of current commercial inspectors. This offers a great convenience and cost saving to the users, and also provides images with much better fiber centering.

Cleaner Module

As shown in FIGS. 2-3, a cleaner module 40 is also attached on the apparatus 1, making the apparatus 1 a very convenient field-use tool for both connector inspection and connector cleaning. The snap-in interfacing mechanism allows easy mounting/dismounting of the cleaner module 40 onto/from the main body of the apparatus 1.

Figure 10:
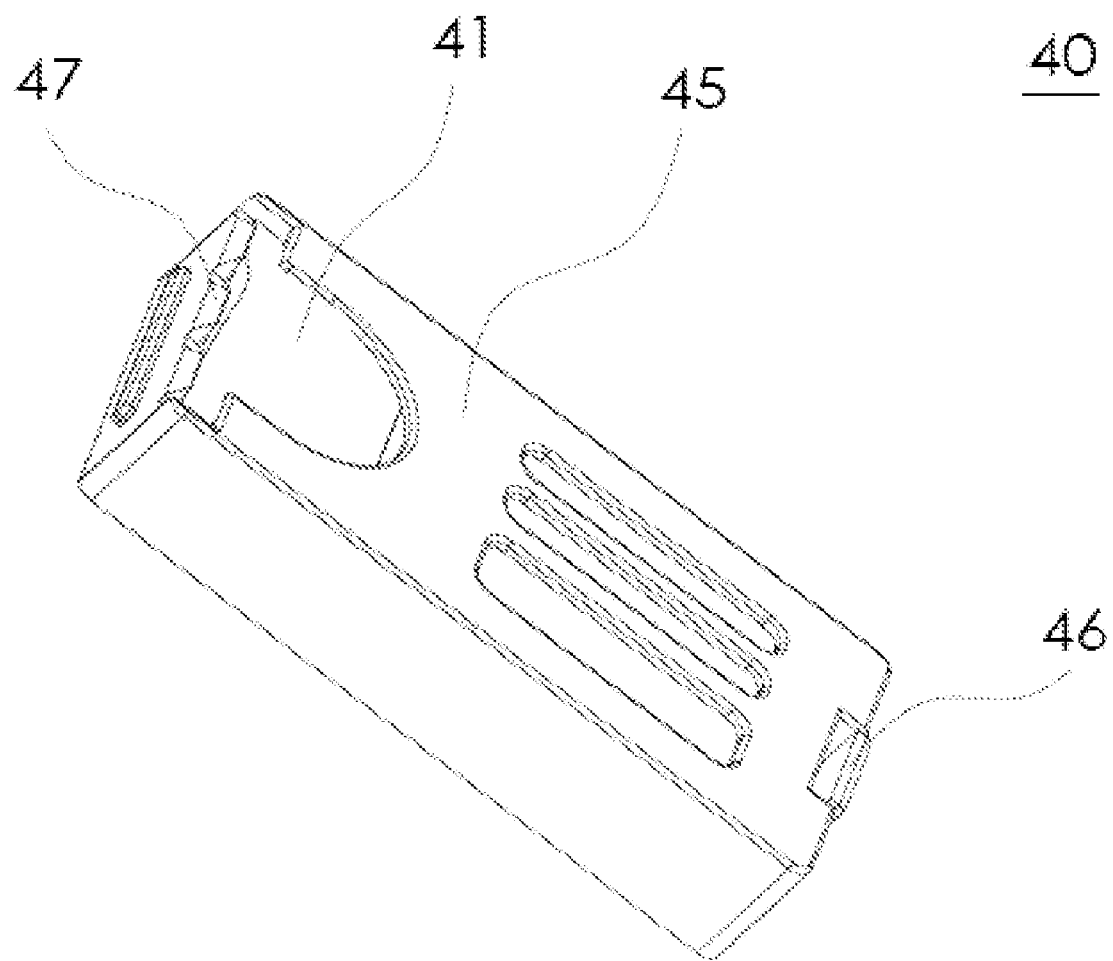
FIG. 10 is a perspective assembled view of the cleaner module of the apparatus for cleaning fiber optic connectors.
Figure 11:
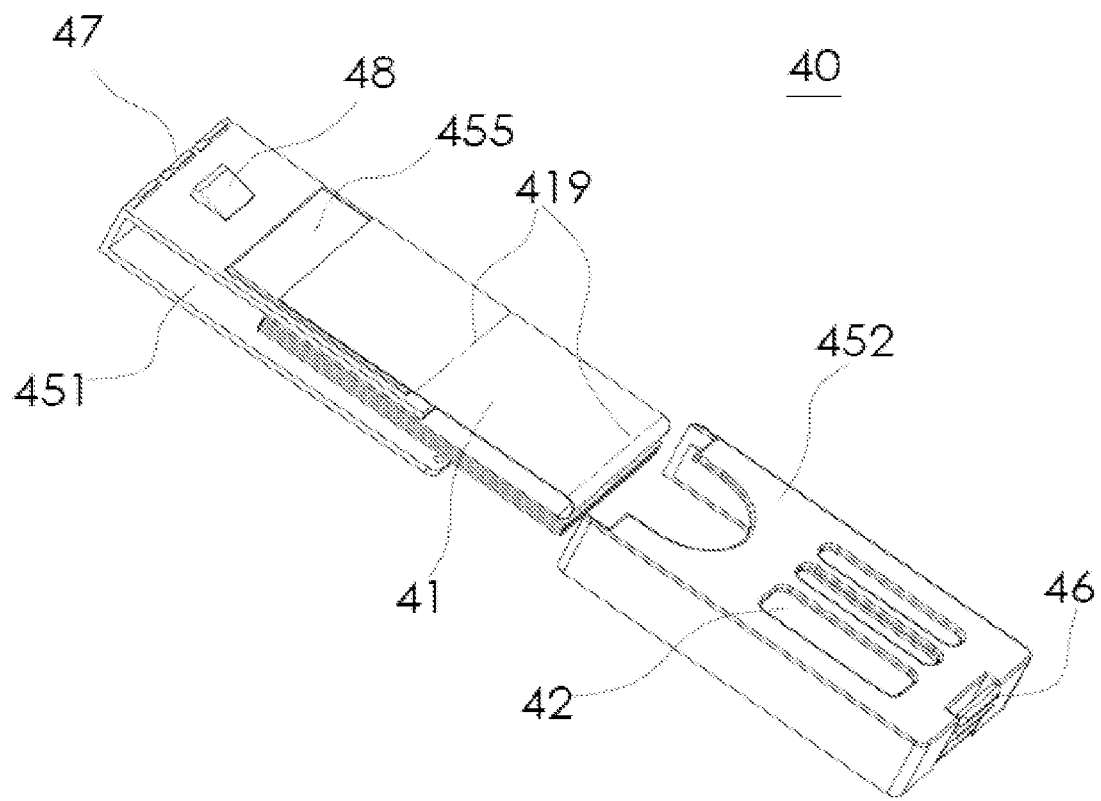
FIG. 11 is a perspective exploded view of the cleaner module of the apparatus for cleaning fiber optic connectors.

As shown in FIGS. 10-11, the cleaner module 40 comprises a cassette 45 filled with a cleaning wiper stack 41. The cassette 45 is formed of two parts, an inner cassette structure 451 and an outer cassette structure 452. A cushion pad 455 is affixed to the top surface of the inner cassette structure 451, and the cleaning wiper stack 41 is placed under this top surface with the leading layer extended over the cushion pad

455. To close the cassette 45, the cleaning wiper stack 41, if pulled out as shown in FIG. 11, should be pushed in, and then the outer cassette structure 452 is slid over this assembly, leaving only a few widow slots 42 and the end zone exposed as shown in FIG. 10. Thus the extended layer of the cleaning wiper stack 41 is sandwiched between the cushion pad 455 and the top plate of the outer cassette structure 452. To clean a male connector ferrule, simply point the ferrule end onto the exposed wiper in a slot 42 and drag the ferrule, with a certain pressing force, from one end of the slot 42 to the other end. The multiple-slot structure allows multiple independent cleanings. Once all the slots 42 on a wiper sheet have been used, the wiper sheet should be pulled out and at the same time the next clean sheet is pulled in place. In case the to-be-cleaned ferrule is heavily contaminated, a wet cleaning may be needed. In this case, a drop of cleaning solvent can be applied to the wiper through a slot 42. In the cleaning process, drag the ferrule through the wet slot first, and then drag it through a dry slot for drying out. The multiple-slot structure allows the convenience of having wet/dry slots available at the same time on the same sheet. The wide slot allows, in addition to its regular function as the narrow ones, it also allows cleaning of larger-size ferrules. The wiper is usually made of lint-free fabric materials, and the cleaning wiper stack 41 is perforated with perforation lines 419 at fixed intervals to yield tearable wiper sheets of a specified size. After each cleaning the used wiper sheet can be pulled out and torn off, and a new sheet is advanced in place. The bump 48 on the top surface of the inner cassette structure 451 is disposed for lifting the wiper for easy fetch and pulling. The dentations 47 on the top plate edge of the inner cassette structure 451 helps control the wiper advancement (by hooking the perforation line 419) and also helps wiper tearing. After the cleaning wiper stack 41 is used up, the cleaner module 40 can be replaced with a new one; or a new cleaning wiper stack 41 can be refilled in the cassette 45. An automatic mechanism for advancing the wiper sheets is also possible, which is a kind of tape system, allowing the wipers to be rolled over instead of torn off. But a tape system may occupy more space.

The material of the cushion pad 455 is chosen to have optimal stiffness thus ensuring an optimal contact interface with the ferrule end and optimal cleaning result.

The snap-on flap 46 on the outer cassette structure 452 is designed for locking the cleaner module 40 onto the apparatus 1. Upon plugging the cassette 45 into the notch space on the front surface of the apparatus 1, the snap-on flap 46 will grip the rabbet on the sidewall of the notch space and thus lock the cassette 45 in position. To detach the cleaner module 40 from the apparatus, press on the snap-on flap 46 to release the lock and pull the cassette 45 out from the notch space.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A portable apparatus for inspecting and cleaning fiber optic connectors, comprising:
   a housing with a front side and an adapting-tip receptacle;
   an adapting tip having a first end receivable in the adapting-tip receptacle and a channel at a second end for interfacing with a fiber optic connector;
   an optical module embedded in the housing for capturing an endface image of a ferrule of an fiber-optic connector interfaced with the adapting tip and converting the endface image into a video signal;
   a focusing knob connected to the optical module for focusing the endface image;
   an LCD screen on the front side of the housing for displaying the video signal of the endface image; and
   a cleaner module removably attached to the housing.

2. The portable apparatus for inspecting and cleaning fiber optic connectors of claim 1, wherein a ferrule of a male fiber-optic connector is insertable into the channel of the adapting tip for the male fiber-optic connector to be interfaced with the adapting tip.

3. The portable apparatus for inspecting and cleaning fiber optic connectors of claim 2, wherein a step is disposed around an inner wall of the channel of the adapting tip for stopping the ferrule of the male fiber optic connector to be interfaced with the adapting tip.

4. The portable apparatus for inspecting and cleaning fiber optic connectors of claim 3, wherein the channel of the adapting tip is sized for a ferrule size which is selected from the group consisting of 1.25 mm, 1.6 mm, 2.0 mm and 2.5 mm.

5. The portable apparatus for inspecting and cleaning fiber optic connectors of claim 2, further comprising a converter to enable the adapting tip to interface with a female fiber-optic connector, which converter comprising a tube casing and a gradient refractive index (GRIN) rod fitted inside the tube casing, wherein
   a first end of the tube casing is insertable into the channel of the adapting tip and a second end of the tube casing is insertable into a ferrule-mating sleeve inside a connector-mating adapter for a female fiber-optic connector to be interfaced with the adapting tip; and
   when the first end of the tube casing is inserted into the channel of the adapting tip and the second end of the tube casing is inserted into one side of the ferrule-mating sleeve of the connector-mating adapter such that the second end of the tube casing touches a chamfer edge of the ferrule of the female optic-fiber connector connected to the opposite side of the ferrule-mating sleeve, the GRIN rod relays the endface image of the ferrule of the female optic-fiber connector from the second end of the tube casing to the first end of the tube casing inside the channel of the adapting tip to allow the optical module to capture and convert the endface image.

6. The portable apparatus for inspecting and cleaning fiber optic connectors of claim 5, wherein the GRIN rod is substantially coextensive with the tube casing but slightly recessed from the second end of the tube casing, leaving a gap between the GRIN rod and the ferrule of the female fiber-optic connector to prevent them from touching each other.

7. The portable apparatus for inspecting and cleaning fiber optic connectors of claim 6, further comprising
   an inspector probe access port for connecting to an external fiber-optic inspector probe, whereby video signals from the external fiber-optic inspector probe instead of the video signal from the optical module are displayed on the LCD screen; and
   a USB video output port for outputting the video signal of the endface image to external electronic devices.

8. The portable apparatus for inspecting and cleaning fiber optic connectors of claim 7, wherein power to the portable apparatus will be automatically turned off after it is turned on for a preset period of time.

9. The portable apparatus for inspecting and cleaning fiber optic connectors of claim 7, further comprising a motion sensor in a vicinity of the adapting tip, wherein power to the portable apparatus will be automatically turned off after a preset period of time has lapsed since a motion is last detected by the motion sensor or since the power is last turned on, whichever is later.

10. The portable apparatus for inspecting and cleaning fiber optic connectors of claim 7, further comprising an axial illumination LED and a side illumination LED for illuminating the endface of a fiber-optic connector interfaced with the adapting tip, wherein a toggle button for turning the side illumination LED on and off is provided on the housing.

11. The portable apparatus for inspecting and cleaning fiber optic connectors of claim 7, wherein the cleaner module comprises:
  a cassette comprising an inner cassette structure and an outer cassette structure, wherein the inner cassette structure has a top surface and a cushion pad disposed on the top surface, and the outer cassette structure has a top plate with at least one slot; and
  a cleaning wiper stack placed under the top surface of the inner cassette structure with a leading layer thereof extended over the cushion pad of the inner cassette structure and under the top plate of the outer cassette structure so that the leading layer is exposed to outside through the at least one slot of the outer cassette structure for a ferrule of a fiber-optic connector to be wiped on for cleaning,
  wherein the cleaning wiper stack is perforated with perforation lines at fixed intervals for easy tearing off after use.

12. The portable apparatus for inspecting and cleaning fiber optic connectors of claim 6, wherein
  the GRIN rod has an angled endface at the second end of the tube casing; and
  when the female fiber-optic connector to be interfaced has an APC polish with its ferrule having an angled endface, the GRIN rod will be oriented such that the angled endface of the GRIN rod is parallel with the angled endface of the ferrule of the female fiber-optic connector.

13. The portable apparatus for inspecting and cleaning fiber optic connectors of claim 12, wherein the GRIN rod is substantially parallel with the tube casing but displaced from a coaxial alignment with the tube casing to compensate for light deflection due to the gap between the angled endface of the ferrule and the angled endface of the GRIN rod so that the endface image is centered in the channel of the adapting tip.

14. The portable apparatus for inspecting and cleaning fiber optic connectors of claim 13, wherein the GRIN rod is displaced from the coaxial alignment by means of asymmetric wall thickness of the tube casing or bumps disposed on inner wall of the tube casing.

15. The portable apparatus for inspecting and cleaning fiber optic connectors of claim 13, further comprising
  an inspector probe access port for connecting to an external fiber-optic inspector probe, whereby video signals from the external fiber-optic inspector probe instead of the video signal from the optical module are displayed on the LCD screen; and
  a USB video output port for outputting the video signal of the endface image to external electronic devices.

16. The portable apparatus for inspecting and cleaning fiber optic connectors of claim 15, wherein power to the portable apparatus will be automatically turned off after it is turned on for a preset period of time.

17. The portable apparatus for inspecting and cleaning fiber optic connectors of claim 15, further comprising a motion sensor in a vicinity of the adapting tip, wherein power to the portable apparatus will be automatically turned off after a preset period of time has lapsed since a motion is last detected by the motion sensor or since the power is last turned on, whichever is later.

18. The portable apparatus for inspecting and cleaning fiber optic connectors of claim 15, further comprising an axial illumination LED and a side illumination LED for illuminating the endface of a fiber-optic connector interfaced with the adapting tip, wherein a toggle button for turning the side illumination LED on and off is provided on the housing.

19. The portable apparatus for inspecting and cleaning fiber optic connectors of claim 15, wherein the cleaner module comprises:
  a cassette comprising an inner cassette structure and an outer cassette structure, wherein the inner cassette structure has a top surface and a cushion pad disposed on the top surface, and the outer cassette structure has a top plate with at least one slot; and
  a cleaning wiper stack placed under the top surface of the inner cassette structure with a leading layer thereof extended over the cushion pad of the inner cassette structure and under the top plate of the outer cassette structure so that the leading layer is exposed to outside through the at least one slot of the outer cassette structure, wherein the cleaning wiper stack is perforated with perforation lines at fixed intervals for easy tearing off after use.

* * * * *